(12) United States Patent
Spencer

(10) Patent No.: US 12,146,469 B2
(45) Date of Patent: *Nov. 19, 2024

(54) VERTICAL AXLE WINDMILL TORQUE RING

(71) Applicant: George A Spencer, Athens, TX (US)

(72) Inventor: George A Spencer, Athens, TX (US)

(73) Assignee: George A. Spencer, Athens, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/602,527

(22) Filed: Mar. 12, 2024

(65) Prior Publication Data

US 2024/0240611 A1 Jul. 18, 2024

Related U.S. Application Data

(63) Continuation-in-part of application No. 18/366,408, filed on Aug. 7, 2023, now Pat. No. 11,933,271, (Continued)

(51) Int. Cl.
*F03D 3/06* (2006.01)
*F03D 3/00* (2006.01)
(Continued)

(52) U.S. Cl.
CPC ............. *F03D 3/067* (2013.01); *F03D 3/005* (2013.01); *F03D 80/70* (2016.05); *F03D 3/02* (2013.01);
(Continued)

(58) Field of Classification Search
CPC ............. F03D 3/005; F03D 3/02; F03D 3/062
See application file for complete search history.

(56) References Cited

U.S. PATENT DOCUMENTS 1,036,109 A 8/1912 Haslinger et al.
3,793,530 A 2/1974 Carter
(Continued)

FOREIGN PATENT DOCUMENTS

| CA | 2685189 C | 6/2015 |
|---|---|---|
| GB | 2296048 A | 6/1996 |
| WO | 2006131935 A1 | 12/2006 |

OTHER PUBLICATIONS

Powers, Thomas., "Design of a Retractable Vane for a Vertical Axis Wind Turbine", Olivet Nazarene University Digital Commons @ Olivet, Jul. 29, 2011, p. 28.

*Primary Examiner* — Brian O Peters

(57) ABSTRACT

A vertical axis windmill turbine includes a support structure for supporting the vertical axis windmill turbine above ground level. At least one rotor rotates upon the support structure. The at least one rotor has a horizontal structure having a rotational axis perpendicular to the ground level. The support structure further comprises at least one circular torque ring member extending around the rotational axis of the at least one rotor. A plurality of blades positioned within each of the at least one rotor causes the at least one rotor to rotate on the support structure responsive to wind force. A plurality of torque ring mounting connectors associated with each of the plurality of blades interconnect the at least one circular torque ring to the plurality of blades. A plurality of vanes are located on each of the plurality of blades and rotate between an open position to limit drag on the at least one rotor and a closed position that provides a rotational force to the at least one rotor. The plurality of vanes rotating between the open position and the closed position responsive to a wind force.

19 Claims, 11 Drawing Sheets

Related U.S. Application Data which is a continuation-in-part of application No. 18/096,805, filed on Jan. 13, 2023, now Pat. No. 11,795,909.

(51) Int. Cl.
  *F03D 3/02* (2006.01)
  *F03D 80/70* (2016.01)

(52) U.S. Cl.
  CPC ..... *F05B 2240/215* (2013.01); *F05B 2240/50* (2013.01)

(56) References Cited

U.S. PATENT DOCUMENTS

| | | |
|---|---|---|
| 3,995,170 A | 11/1976 | Graybill |
| 4,115,027 A | 9/1978 | Thomas |
| 4,346,305 A | 8/1982 | White |
| 4,468,169 A | 8/1984 | Williams |
| 5,332,925 A | 7/1994 | Thomas |
| 5,951,249 A | 9/1999 | Aylor |
| 6,320,273 B1 | 11/2001 | Nemec |
| 6,413,038 B1 | 7/2002 | Lord |
| 6,857,846 B2 | 2/2005 | Miller |
| 8,684,817 B2 | 4/2014 | Walker et al. |
| 8,979,494 B1 | 3/2015 | Myers |
| 10,041,478 B2 | 8/2018 | Spencer |
| 2004/0213670 A1 | 10/2004 | Alexander et al. |
| 2008/0292460 A1 | 11/2008 | Kuo et al. |
| 2009/0066088 A1 | 3/2009 | Liang |
| 2009/0097960 A1 | 4/2009 | Williams |
| 2009/0180880 A1 | 7/2009 | Ersoy |
| 2010/0109337 A1 | 5/2010 | Wang et al. |
| 2011/0068581 A1 | 3/2011 | Lowery |
| 2011/0133474 A1 | 6/2011 | Haar |
| 2012/0047976 A1 | 3/2012 | Vanderhye |
| 2012/0121414 A1 | 5/2012 | Steinberg et al. |
| 2017/0241403 A1 | 8/2017 | Spencer |

VERTICAL AXLE WINDMILL TORQUE RING

CROSS-REFERENCE TO RELATED APPLICATIONS

This application is a continuation-in-part of U.S. patent application Ser. No. 18/366,408, filed Aug. 7, 2023, entitled VERTICAL AXIS WIND TURBINE WITH ROTATING VANES, issuing as U.S. Pat. No. 11,933,271 on Mar. 19, 2024, which is a continuation-in-part of U.S. patent application Ser. No. 18/096,805, filed Jan. 13, 2023, entitled VERTICAL AXIS WIND TURBINE WITH ROTATING VANES, issued as U.S. Pat. No. 11,795,909 on Oct. 24, 2023. All the foregoing, including patent application Ser. Nos. 18/096,805 and 18/366,408, and U.S. Pat. Nos. 11,933,271 and 11,795,909 are incorporated by reference herein in their entirety.

TECHNICAL FIELD

The present invention relates to vertical axis wind turbines and more particularly, to an improved system for interconnecting vane assemblies, herein known as blades, and blade roller assemblies of which the blades travel upon.

The Technical Field also encompasses the distribution of blade torque, blade frame drag, and roller drag which are redistributed within the Torque Ring as described here within.

The Technical Field also includes the installing, uninstalling, and the maintaining of the blades and rollers.

BACKGROUND

The Torque Ring's need became obvious when attempting to repair an engineering prototype. Instead of minutes, it took hours to reconnect a blade that was disconnected for repair.

As a further consideration the Torque Ring will reduce drag thereby improving blade efficiency, even though this may not appear obvious, it is accomplished by isolating each blade's stress thereby eliminating the blade frame's need to carry the aggregate force of all blades within its circumference. By reducing the blade frame's stress load allows for the reduction of the frame's wind cross sectional area which is the primary efficiency loss due to drag.

SUMMARY

The present Torque Ring invention, as disclosed and described herein, is a major enhancement to the afore cross-reference patents by the consolation and redistribution of torque forces via the Torque Ring; improving Wind Turbine's efficiency and provides a convenient method of connecting and disconnecting blades.

This invention addresses improvements that are needed to the afore cross-referenced patents, with regards to both blade torque consolidation and blade installation and/or replacement, In the crossed-referenced patents each ring of blades are directly connected one blade to the next within its circumference via an interconnecting braces. These interconnecting braces carry all of the compression and tinsel forces within each circumference of blades. Even in a static non rotating state the braces are under a stress load due to installation misalignment and temperature expansion and contraction. Due to the brace stress load a misalignment and gap spacing issues may occur when blades are disconnected from their respective braces. Just the smallest of misalignment or gap can greatly exacerbate the blade's reconnection.

By incorporating a Torque Ring that carries the primary stress loads, eliminates the need for direct blade to blade bracing; it thereby aids to isolates the blade from misalignments.

The Torque Ring would greatly increase and improves Wind Turbine efficiency by reducing frame drag; the blade frame's wind cross sectional area. As the Torque Ring has little or no wind torque cross sectional area, it can be made larger in order to carry larger stress loads with minimum negative effect on Wind Turbine's efficiency; thereby allowing the blade's frame to be made of weaker lower wind profile material to greatly improve Wind Turbine efficiency:

Example (1) With Torque Ring: Frame area is 10% of the vane area; Blade is 75% efficient.

Example (2) Without Torque Ring: Frame area is 20% of the vane area; Blade is 54% efficient.

NOTE: this is not the Wind Turbine's overall efficiency; it is only an example of the affect of changing the ratio of the vane's to frame's wind profile areas. In these examples the blade's efficiency is derived with a 90 degree perpendicular wind of 40 mph and a Wind Turbine tip rotational speed or 10 mph. See math examples here within.

BRIEF DESCRIPTION OF THE DRAWINGS

For a more complete understanding, reference is now made to the following description taken in conjunction with the accompanying Drawings in which.

DETAILED DESCRIPTION

Figure 1:
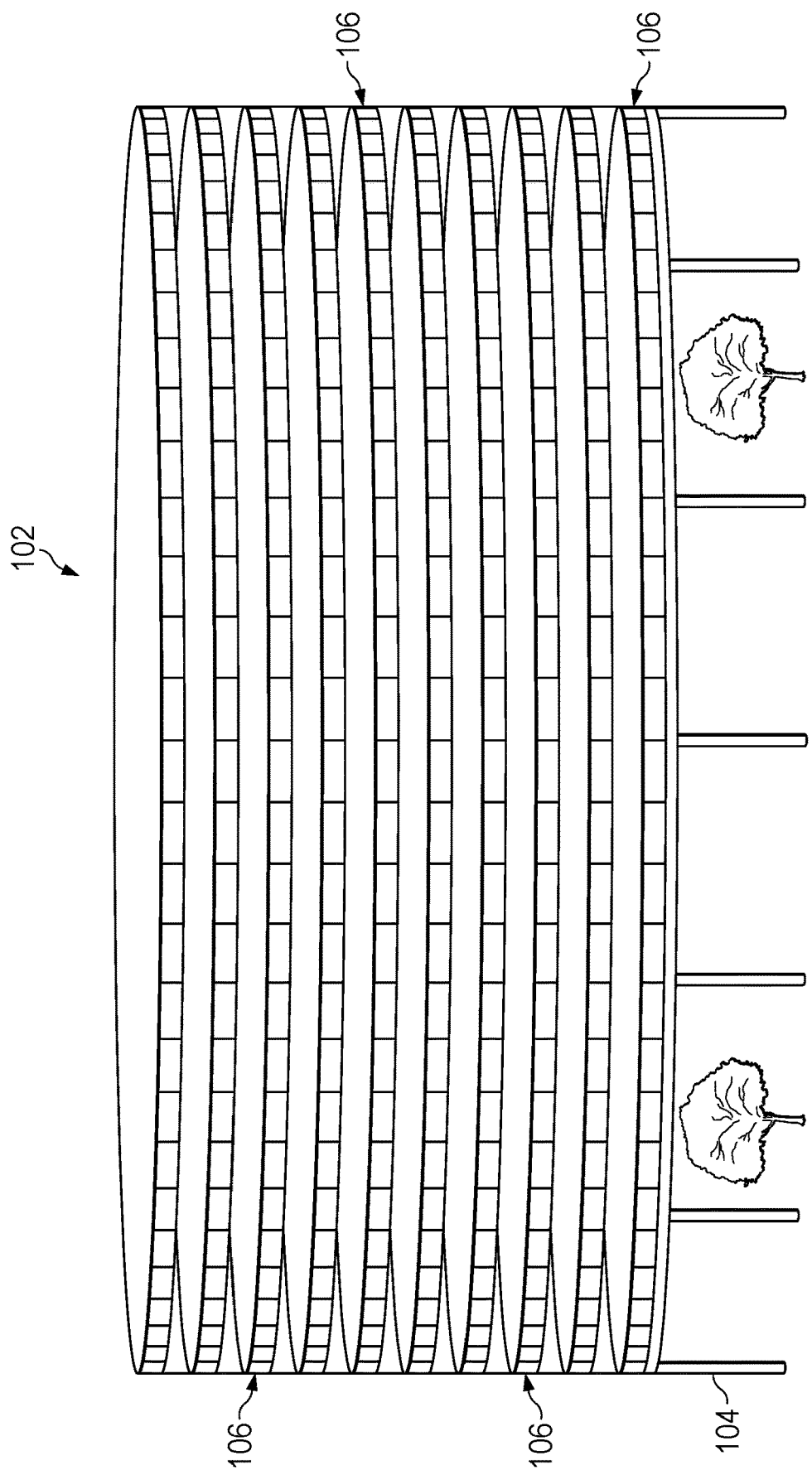
FIG. 1 illustrates a multi-rotor Vertical Axis Wind Turbine (VAWT)

Referring now to the drawings some of which are the afore cross-reference patents, wherein like reference numbers are used herein to designate like elements throughout, the various views and embodiments of the vertical axis Wind Turbine with rotating vanes and interconnecting Torque Rings and Jack Legs are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

It will be appreciated by those skilled in the art having the benefit of this disclosure that this vertical axis Wind Turbine provides an improved manner of wind generation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

Referring now to the drawings, and more particularly to FIG. 1, which is incorporated here within as afore referenced. FIG. 1 illustrates a view of a Vertical Axis Wind Turbine (VAWT) 102, in which the Torque Ring is to be incorporated in accordance with the disclosure here within.

Figure 2:
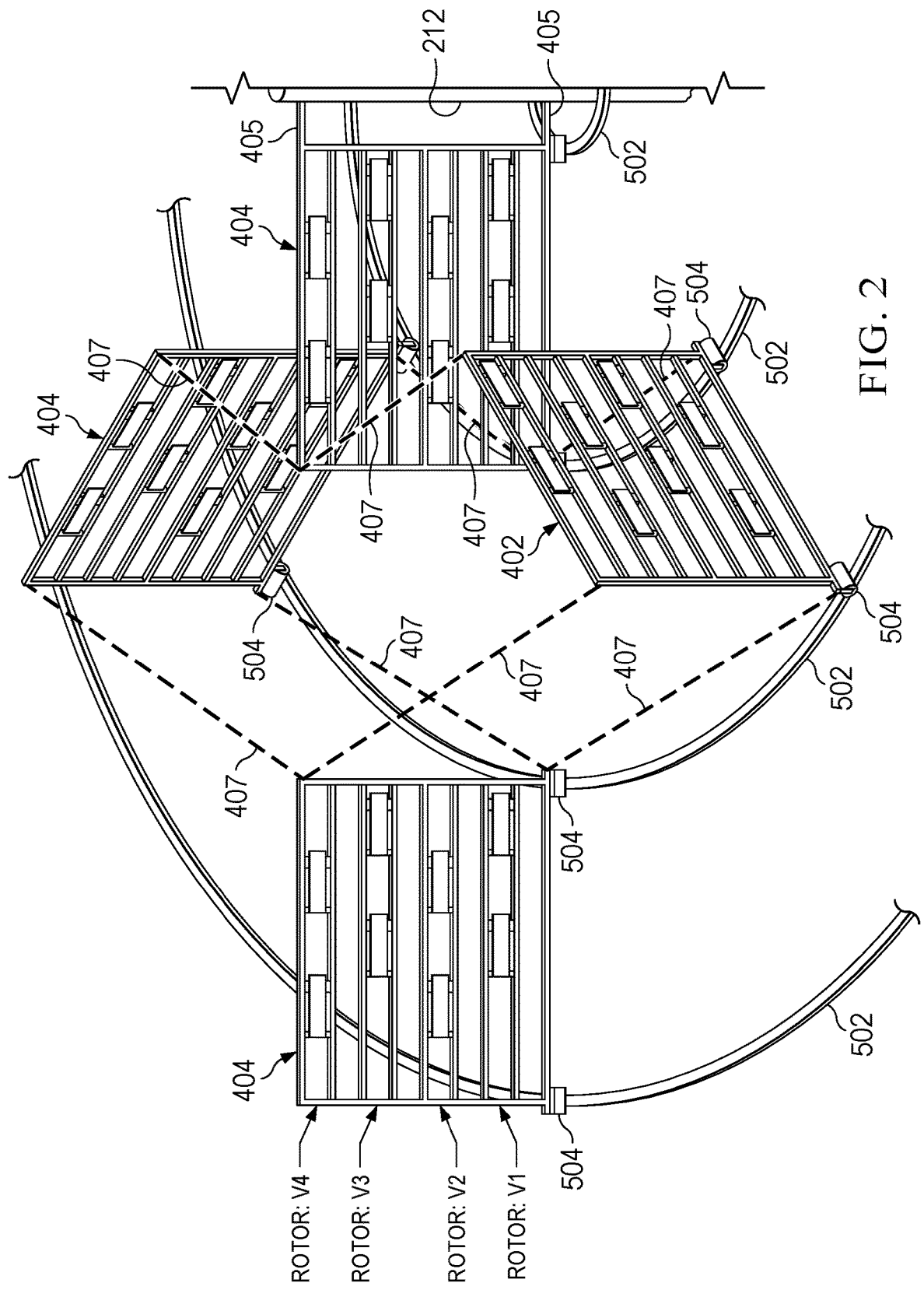
FIG. 2 illustrates the manner in which blades are directly connected blade to blade within a VAWT.

Referring now to FIG. 2 which is incorporated here within as afore referenced, there are illustrated the placement of various odd blades 402 and even blades 404 upon support rings 502 of the VAWT. As can be seen, the blades are directly interconnected at both the top and bottom corners one to another via interconnecting braces 407.

From time to time blades 404 may need to be removed for service and continuing operating the Wind Turbine without the missing blade/s that are being serviced. The previous discussions show each blade 404 connected directly to the next blade via braces 407, as in FIG. 2.

Figure 3:
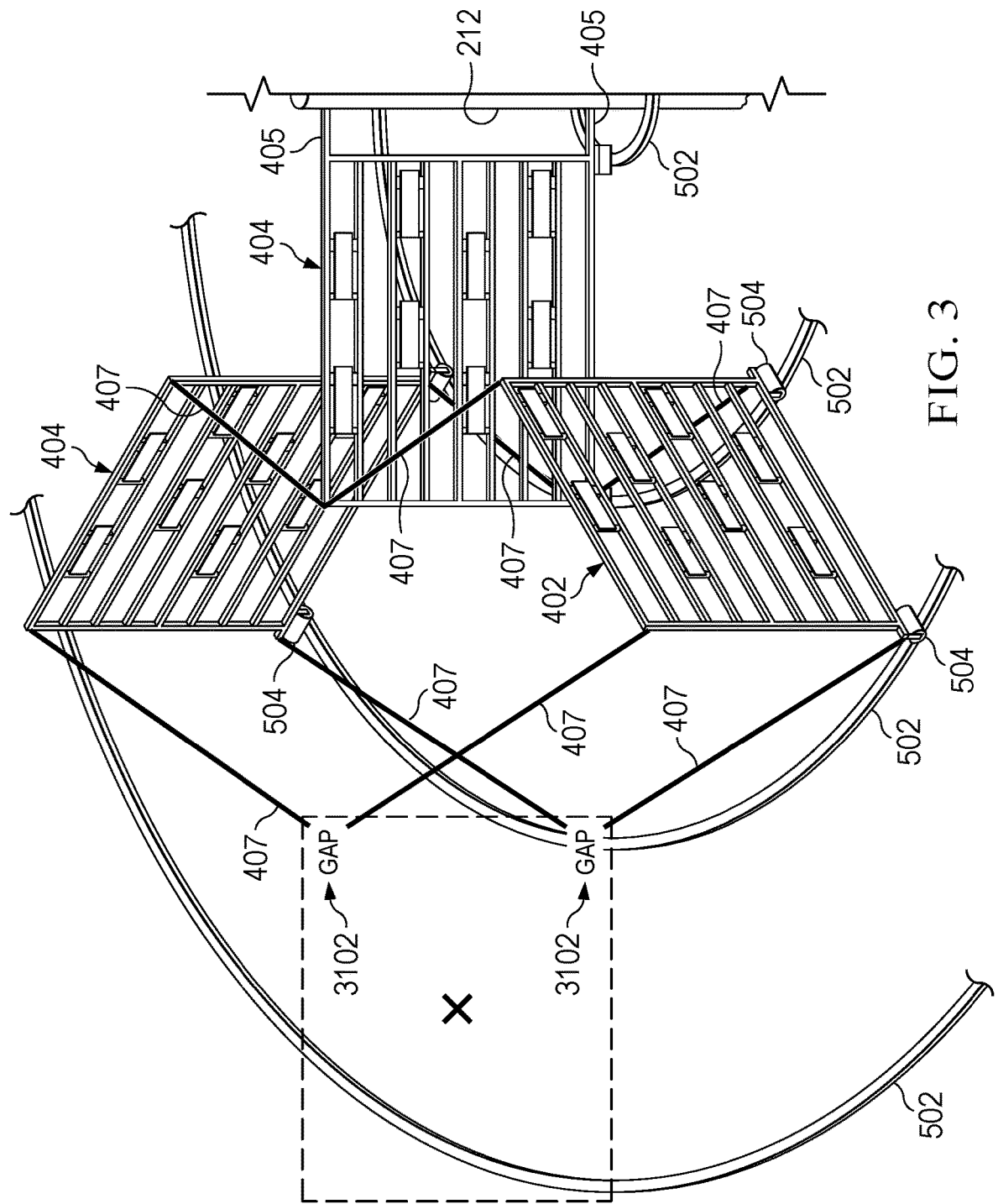
FIG. 3 illustrates FIG. 2 with a missing blade thereby creating a connecting blade to blade gap without a Torque Rings.
Figure 4:
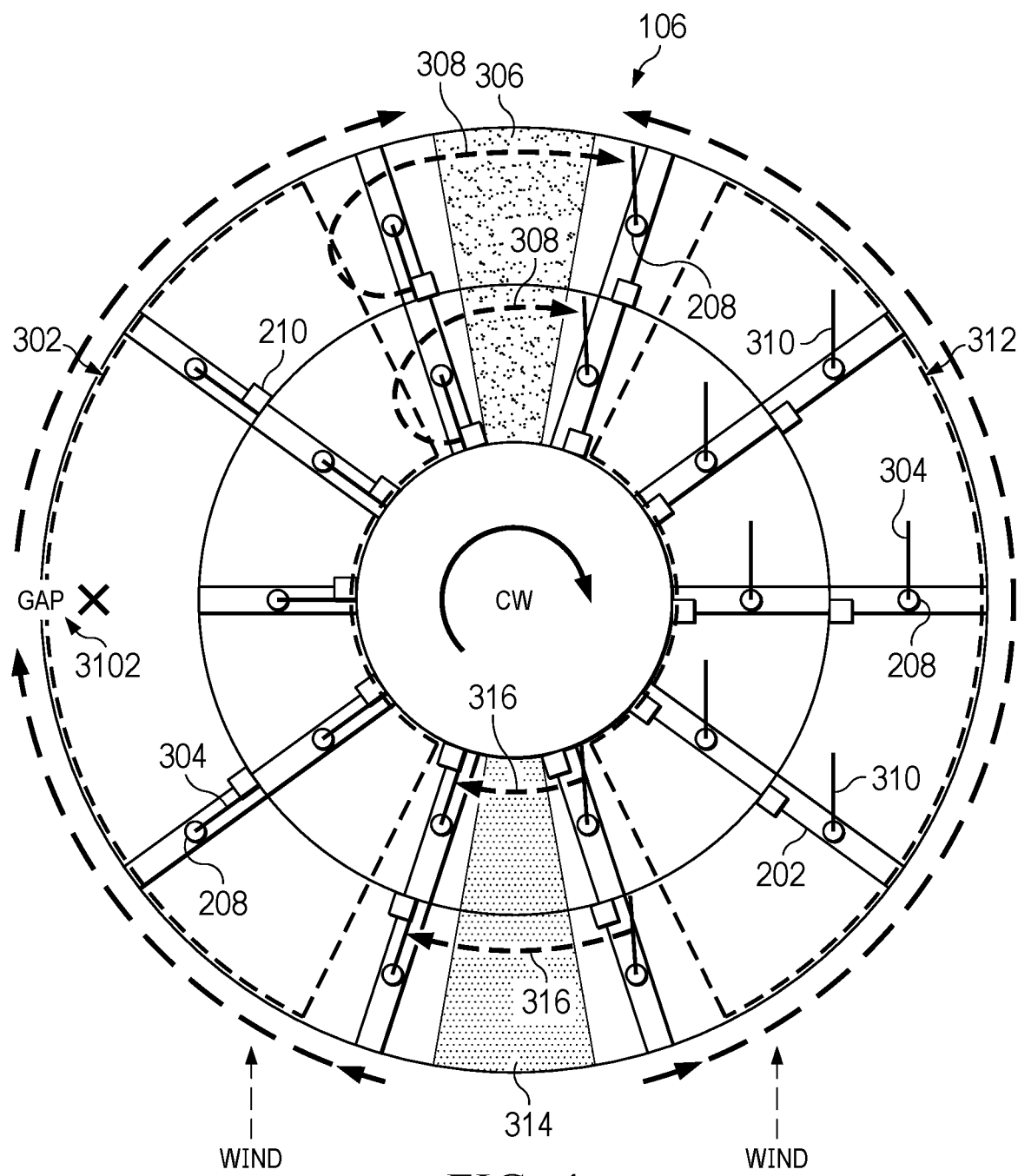
FIG. 4 illustrates a top view of a rotor having a missing blade with a gap and no Torque Ring.

With reference to FIG. 3; therefore when a blade 404 is removed it leaves a gap 3102 to unconnected braces 407, as shown in FIG. 3. This may culminate in a bent or misaligned structure making replacing the removed blades 404 extremely difficult. The gap 3102 created by removal of a blade is further illustrated in the top view of FIG. 4.

Figure 5:
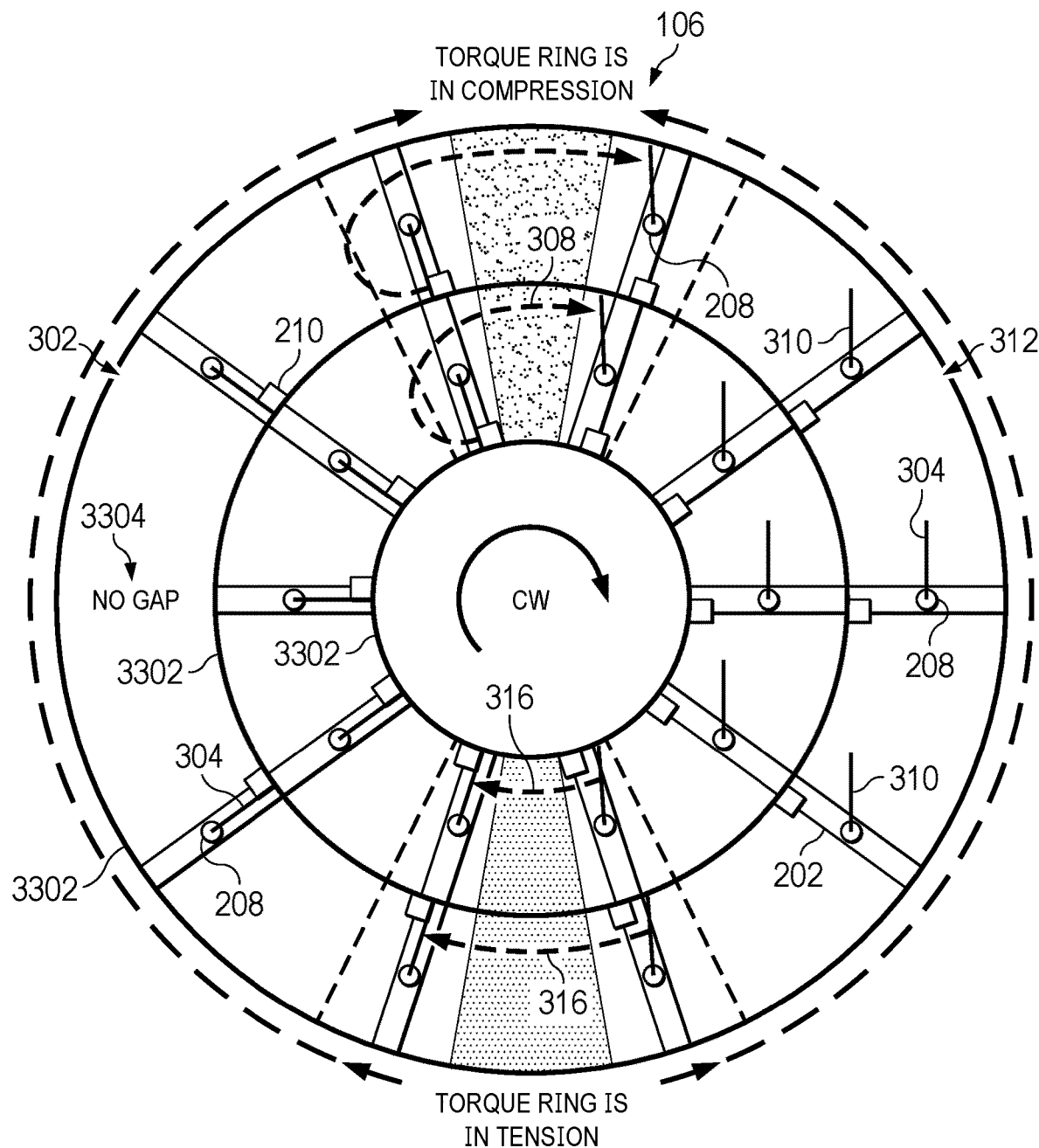
FIG. 5 illustrates a top view of a rotor which contains a Torque Ring and no gap.

With reference to FIG. 5; the support structure of a rotor 106 is improved by the addition of Torque Rings 3302 as illustrated in FIG. 5. The Torque Rings 3302 provide additional support structure both above and below the blades 404 such that when a single blade is removed, at example position 3304, a gap is not created as discussed previously with respect to FIGS. 3 and 4. In this case, each upper and lower edge of blade 404, see FIG. 6 thru FIG. 10 connecting plates 3408 and 3410 (FIG. 6A), is connected to a Torque Ring 3302 on both the top and bottom of the blade 404 in order to structurally support each of the blades without relying on connection of adjacent blades via bracing 407. The Torque Ring 3302 adds strength to the rotor structure while reducing drag as each blade 404 is independently connected to the Torque Rings 3302. In order to transmit all rotational torque forces via the Torque Ring/s 3302 to the generator/s FIG. 6 3420 the Torque Ring/s 3302 are interconnected to the power axle 202 FIG. 2 and FIG. 6

Figure 6A:
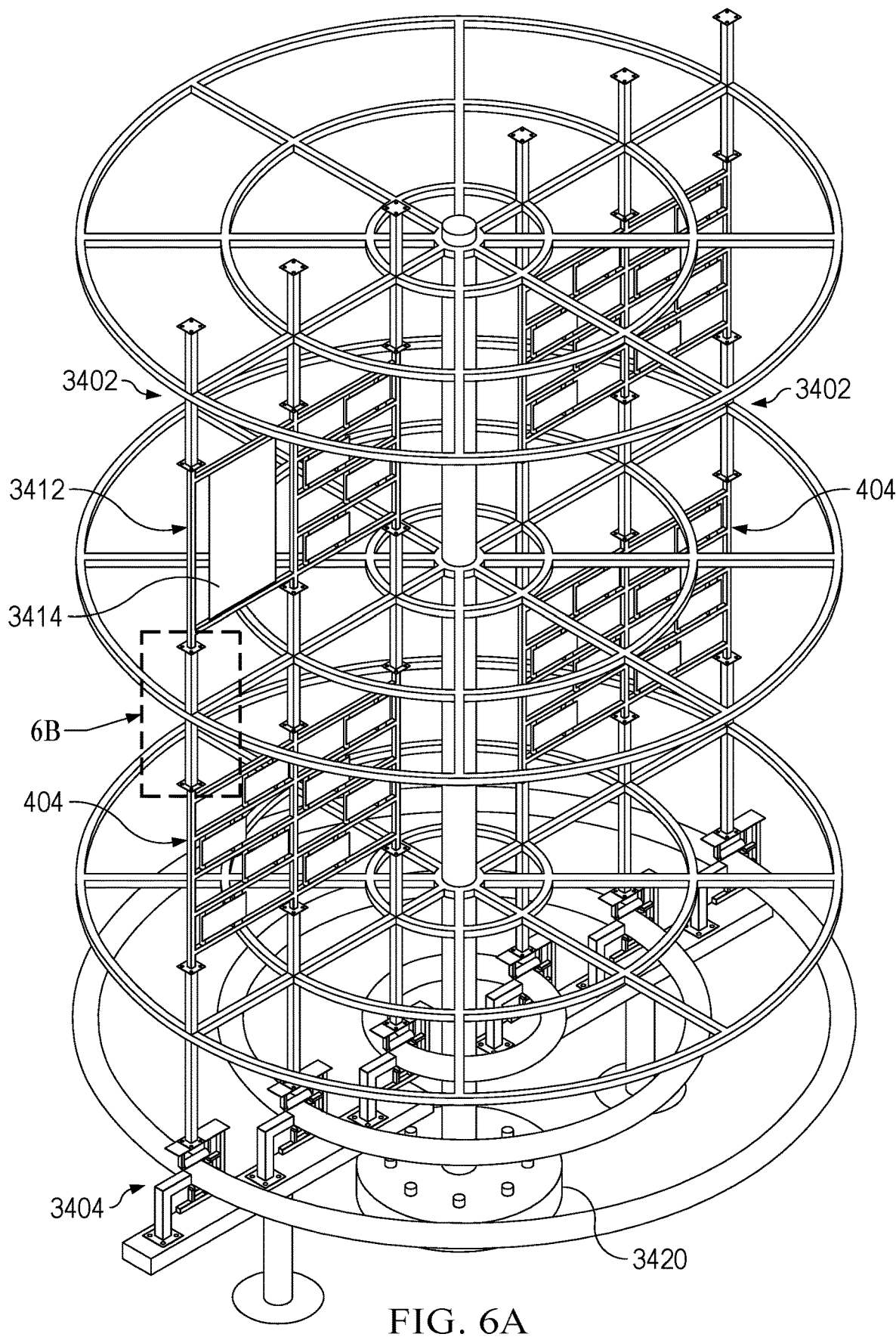
FIG. 6A illustrates a stack of multiple rotors having a missing blade replaced by an associated Jack Leg.

With reference to FIG. 5 & FIG. 6A; the Torque Ring 3302 maintains cohesion of torque and spacing of a blade 404, in a 360 degree horizontal plane. The cohesion is retained, when one or more of the blades 404 have been removed, by continuing to transmit all remaining blades torque from the rotation of the rotor 106 FIG. 1 via the Torque Ring 3302. The Torque Ring 3302 also serves a secondary purpose in that it absorbs rotational torque forces from the blade 404 and roller 504 assemblies, thus allowing easy removal and installation of blades 404 without the need for cables and pulleys assemblies, even though sometimes it is prudent to use cables and pulleys to prevent accidents. The Torque Ring 3302 also bisects the long circumferences connection span between blades, thereby increasing the bending strength of the Torque Ring 3302. As the Torque Ring 3302 carries the lion share of the blade torque, the blade frame can be made with a lower wind profile improving the frame to vane wind area ratio which is a primary factor associated with induced and parasitic drag. Therefore, the Torque Ring 3302 reduces drag and increasing efficiency.

Figure 7:
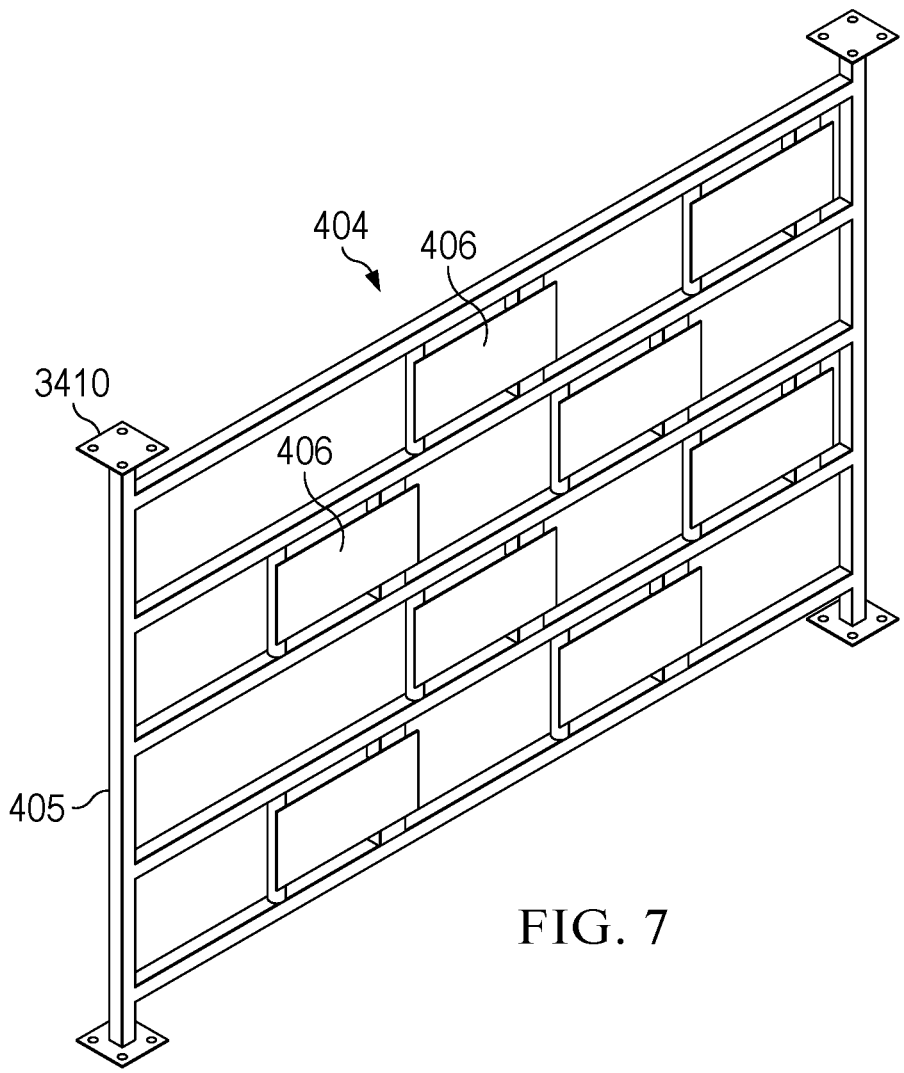
FIG. 7 illustrates a blade with Torque Ring mounts comprised of a frame which contains vanes; (force Vs drag ratio)
Figure 8:
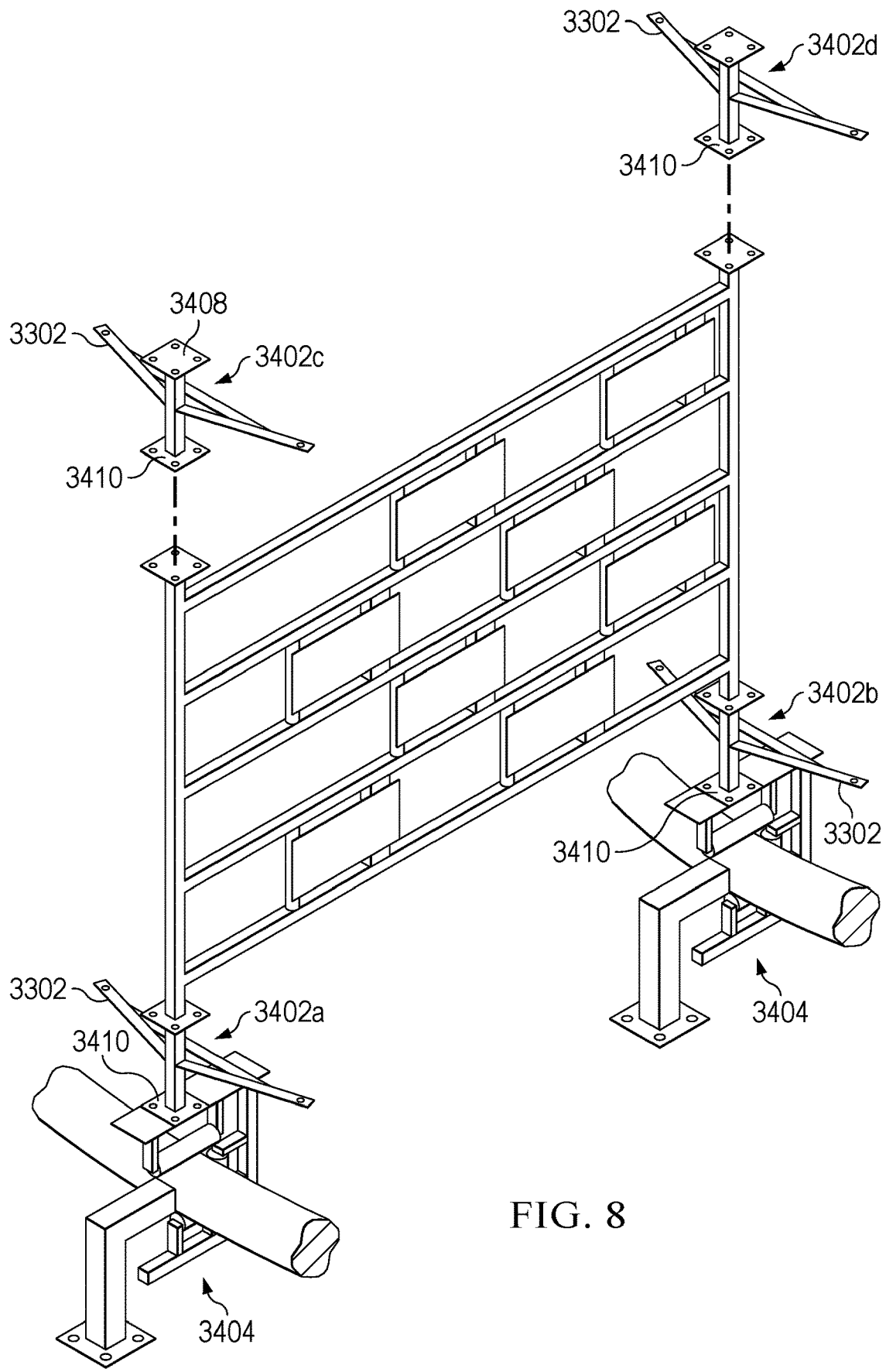
FIG. 8 illustrates a single blade and blade rollers interconnected with first and second Torque Rings.

The MATH:

As the Torque Ring 3302 FIG. 8 has little or no wind torque cross sectional area, it therefore can be made larger in order to carry larger stress loads with minimum negative effect on Wind Turbine's 102 efficiency; thereby allowing the blade's frame FIG. 7 to be made of weaker lower wind profile material to greatly improve Wind Turbine 102 FIG. 1 efficiency:

Example 1) with a Torque Ring 3302:

Reference FIG. 7 frame area 405 is 10% of the vane area 406; the blade 404; with respect to drag, achieves 75% efficient.

Example 2) without a Torque Ring 3302:

Reference FIG. 7 frame 405 area is 20% of the vane area 406; based solely on drag, the blade 404 is reduced to 54% efficient.

NOTE: Efficiency

This is not the Wind Turbine's overall efficiency; it is only an example of the effect of changing the ratio of the vane area 406 to frame area 405 wind profile areas. In these examples the blade's efficiency is derived with a 90 degree perpendicular wind of 40 mph and a Wind Turbine 102 tip rotational speed or 10 mph.

For example purposed the Wind Turbine FIG. 5 has a clockwise force rotation and therefore drag is a counter-clockwise force. Both force and drag use the same kinetic energy formula for calculating force in pounds Lbf. However, they each use different ratios of vane area 406 to frame area 405 as well as the wind force speeds for force is 30 mph and drag is 50 mph:

$$\text{Force}(Lbf) = \text{Air Density}(0.00256) \times \text{Area} \times \text{Wind speed squared}$$

|  | Frame % | Force | | Drag | | |
|---|---|---|---|---|---|---|
|  | of vane area | sqft | 30 Wsp^2 | sqft | 50 Wsp^2 | Efficiency |
| AirD = 0.00256 | 100 sqft |  | F = Lbf |  | D = Lbf | (F − D)/F |
| Example (1) w/TR | 10% | 110 | 900 = 254 | 10 | 2,500 = 64 | =75% |
| Example (2) wo/TR | 20% | 120 | 900 = 277 | 20 | 2,500 = 128 | =54% |

The Torque Ring 3302, described herein, achieves the primary functions of: adding strength, improving overall wind efficiency as well as improving functionality of installations and maintenance.

The Torque Ring adds interconnecting strength while reducing the required blade frame 405 size; thereby reducing drag and improving Wind Turbine 102 efficiency.

As the blade's frame no longer carries the aggregate of all torque; its wind profile dimension can be reduced; thereby reducing drag. See detail Example 1) and 2) below.

When a Torque Ring 3302 is employed the frame 405 can be reduced to 10% of the vane area 406 and the blade 404 efficiency is 75%.

However without a Torque Ring 3302; in 40 mph wind speeds and the frame 405 is 20% of the blade area 406 the blade 404 efficiency is 54%.

Referring now to FIG. 1 and FIG. 7:

Force simplified formula

Torque Lbf = Air Density(0.00256) × Area × Wind speed $sq$ $Wsp$ = 40 mph Wind speed $Rsp$ = 10 mph Rotational speed 102

$Fws$ = 30 mph Force wind speed on 406 + 405($Wsp - Rsp$)

$Fws\^2$ = 900 = (30 mph$\^2$)

$Dws$ = 50 mph Drag wind speed on 405($Wsp + Rsp$)

$Dws\^2$ = 2,500 = (50 mph$\^2$)

$Vna$ = 100 sqft Vane 406 area (Wind Turbine may contain a 1,000 + blades 404)

Example (1) with Torque Ring

| | |
|---|---|
| $Fra1$ = 10 sqft | Frame area 1 405 (10% of $Vna$) |
| $Frc1$ = 253 Lbf | Force 1 = 0.00256 × ($Vna$ 100 sqft 406 + $Fra1$ 10 sqft) × $Fws\^2$ 900 = 253 Lbf |
| $Dgf1$ = −64 Lbf | Drag force 1 = (0.00256 × $Fma1$ 10 sqft × $Dws\^2$ 2,500) × −1 = −64 Lbf |
| $Sf1$ = 189 Lbf | Summed force 1 ($Frc1$ 253 Lbf[+]$Dgf1$ − 64 Lbf) = 189 Lbf |
| $Beff1$ = 75% | Blade Efficiency 1 $Sf1$ 189 / $Frc1$ 253 = 75% |

Example (2) without Torque Ring

| | |
|---|---|
| $Fra2$ = 20 sqft | Frame area 2 405 (20% of $Vna$) |
| $Frc2$ = 276 Lbf | Force 2 = 0.00256 × ($Vna$ 100 sqft 406 + $Fra2$ 20 sqft) × $Fws\^2$ 900 = 276 Lbf |
| $Dgf2$ = −128 Lbf | Drag force 2 = (0.00256 × $Fra2$ 20 sqft × $Dws\^2$ 2,500) × −1 = −128 Lbf |
| $Sf2$ = 148 Lbf | Summed force 2 ($Frc2$ 276 Lbf[+]$Dgf2$ − 128 Lbf) = 148 Lbf |
| $Beff2$ = 54% | Blade Efficiency 2 $Sf2$ 148 / $Frc2$ 276 = 54% |

Install and Maintenance:

The Torque Ring 3302 FIG. 6A is a major improvements to the Wind Turbine in that the Torque Ring 3302 not only provides the primary carrier of torque within the Wind Turbine FIG. 6A but it also provides a convenient point for connecting and disconnecting blades 404 and rollers 3404 without compromising the structure of the Wind Turbine FIG. 6A.

Figure 6B:
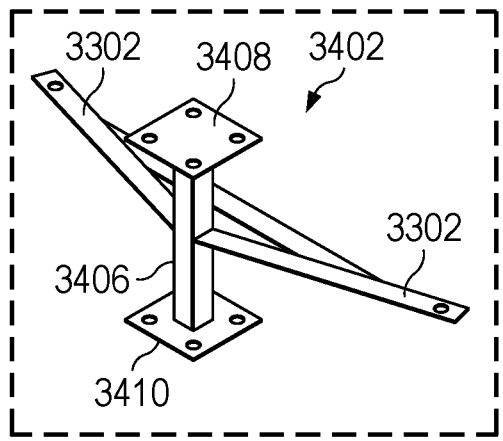
FIG. 6B illustrates the torque ring mounting assembly of FIG. 6A.

The Torque Ring 3302 in FIG. 6A primarily consists of vertical, horizontal and (lateral not shown) components. The horizontal components are the primary carrier of torque and interconnect the Torque Ring mounting assembly 3402 (FIG. 6B). The vertical Torque Ring mounting assembly 3402 provides the interconnection points for blades 404 and rollers 3404. Horizontal components can be made larger to handle torque, while the vertical components can be made smaller to achieve a major improvement in Wind Turbine efficiency.

Referring now to FIGS. 7 and 8, there is more particularly illustrated the manner in which a single blade 404 and blade rollers 2600 (FIG. 11) are connected via four separate Torque Ring mounting assemblies 3402. The blade 404 connects with the various Torque Rings 3302 via a pair of Torque Ring mounting connectors 3402A and 3402B. The bottom Torque Ring connection plate 3410 FIG. 8 thru FIG. 11 connects the roller mounting plate 2602 (FIG. 11). The top connection plate 3408 interconnects the Torque Ring mounting connector 3410 with the bottom corners of the blade 404. In a similar fashion, the top corners of the blade 404 connect with the Torque Rings 3302 located above the blade 404 using a pair of Torque Ring mounting connectors 3402C and 3402D. The bottom plate 3410 of the Torque Ring mounting connectors 3402C and 3402D interconnect with the top corners of the blade 404.

Figure 9:
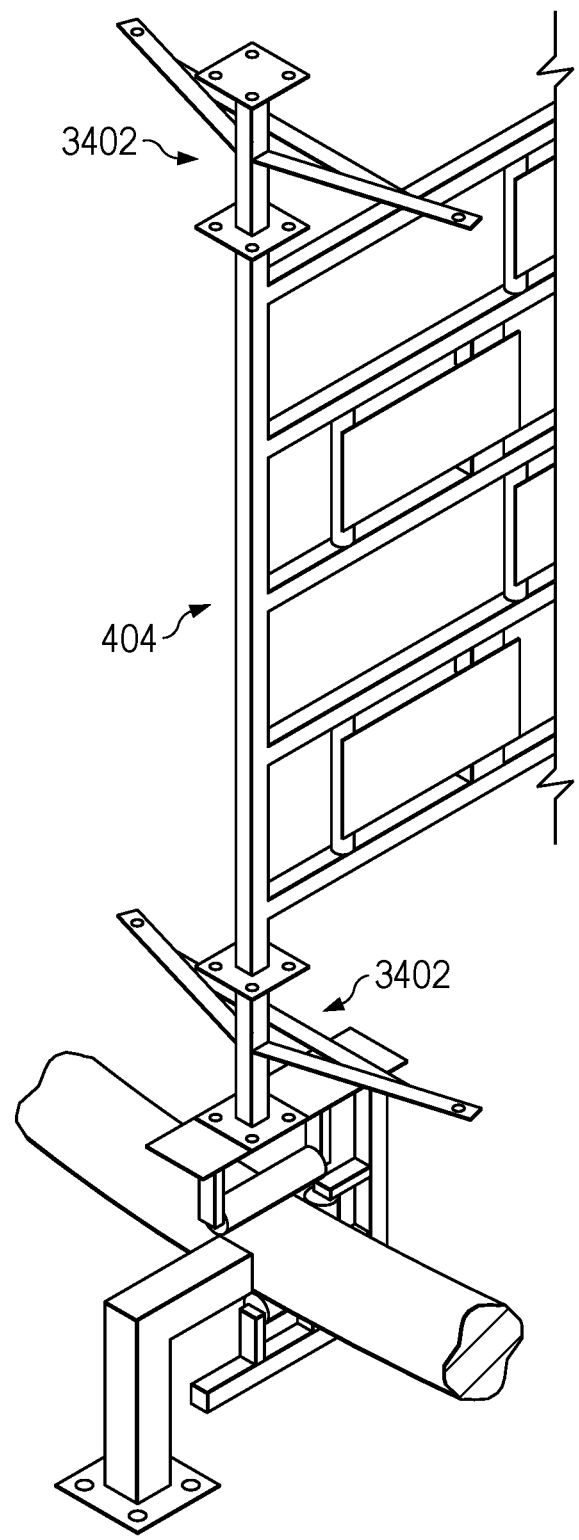
FIG. 9 illustrates a single blade edge and blade rollers interconnected with first and second Torque Rings.
Figure 10:
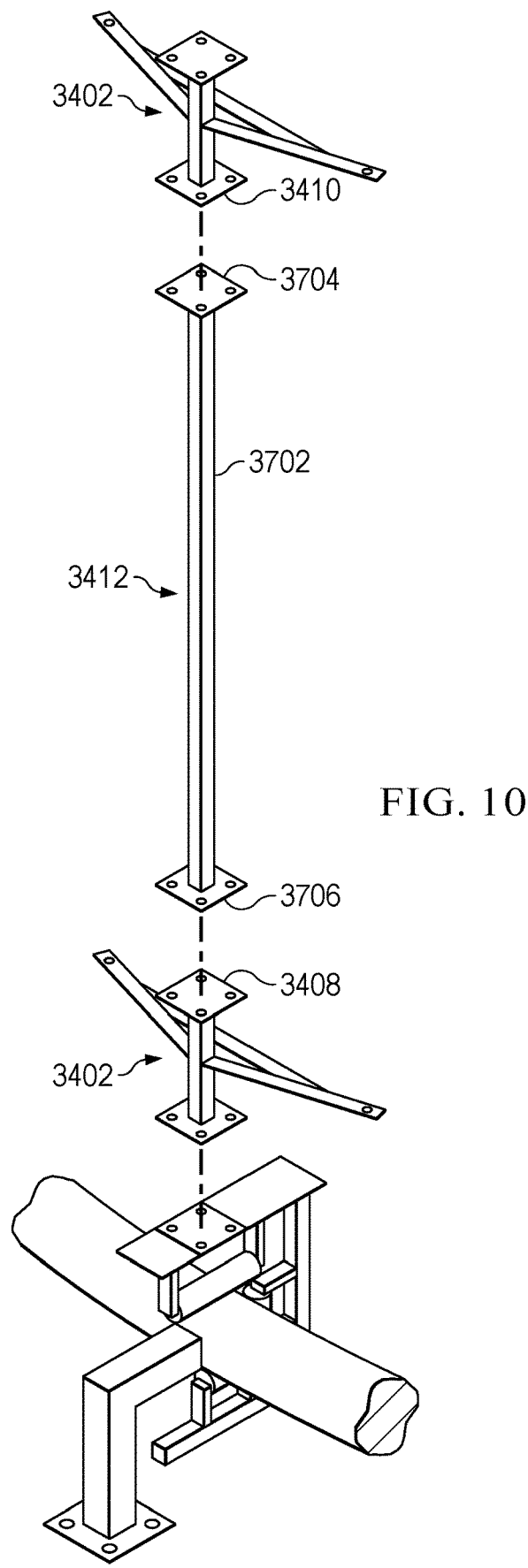
FIG. 10 illustrates a blade replaced by a Jack Leg.
Figure 11:
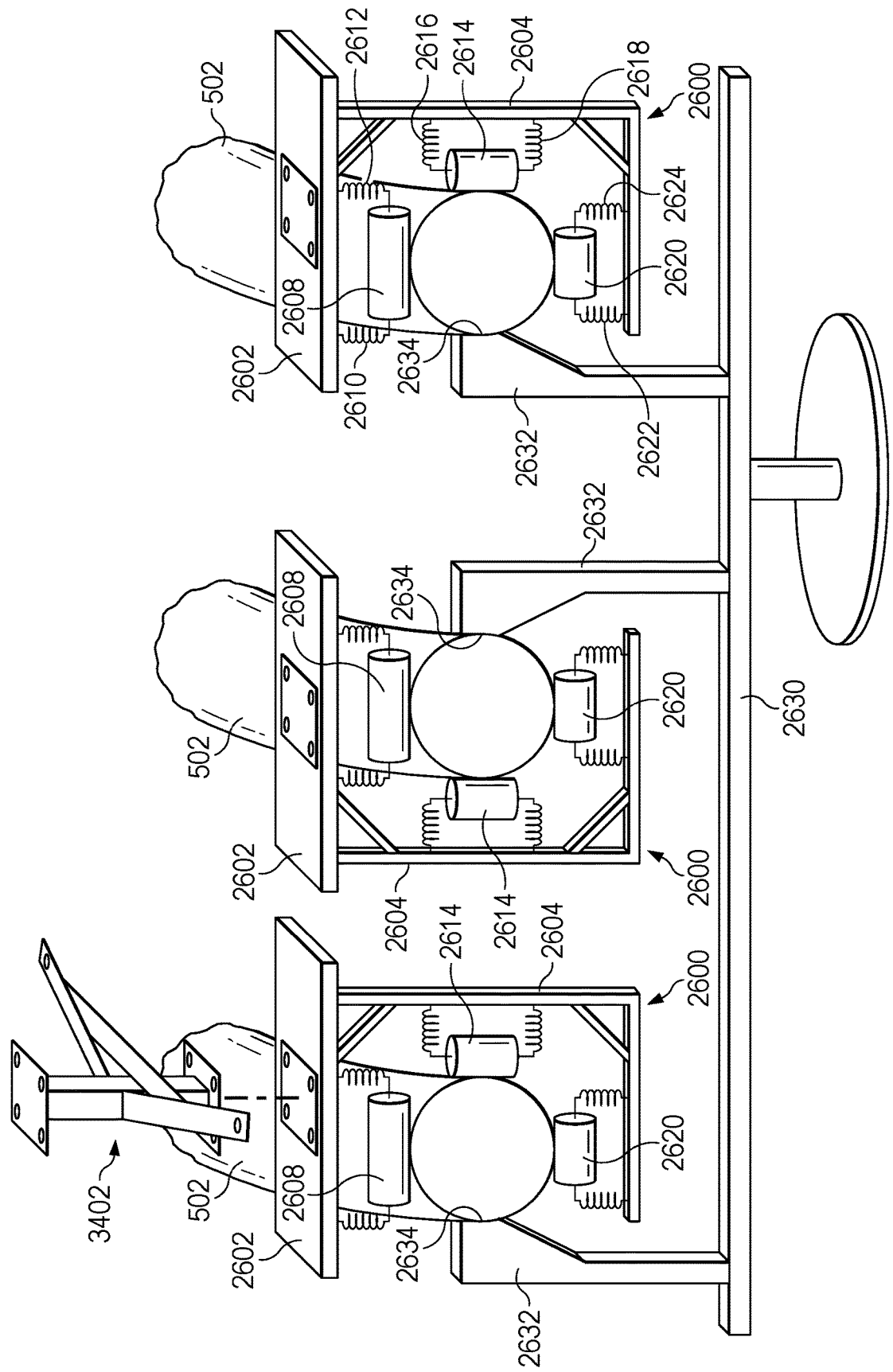
FIG. 11 illustrates a blade roller with Torque Ring mounting assembly.

Referring now to FIGS. 6, 9 and 10 there is illustrated the manner for utilizing a Jack Leg 3412 (FIG. 10) when removing a blade 404 from a rotor. FIG. 9 illustrates a blade 404 that is interconnected between a upper Torque Ring mounting connector 3402 and a lower Torque Ring mounting connector 3402 connecting to the top and bottom corners of the blade respectively. If the blade 404 needs to be removed for any reason such as a repair, a Jack Leg 3412 may be supported therebetween as illustrated in FIG. 10.

FIG. 10 illustrates a Jack Leg 3412 which may be used for interconnecting a pair of Torque Ring mounting assembly 3402 when a blade 404 has been removed from a rotor FIG. 6 as indicated generally at 3412 and FIG. 10 at 3704 and 3706. The Jack Leg 3412 is a replica of the blade frame's vertical end support that spans vertically from one rotor 106 FIG. 1 to another rotor via the Torque Ring mounting assembly 3402 (FIG. 6A). By replacing a missing blade 404 with a Jack Leg 3412, the Wind Turbine's integrity is retained. When the blade 404 has been removed from the location 3414 FIG. 6, a vertical gap would normally exist in the structure of the rotor. By installing a Jack Leg 3412 between the pair of Torque Rings 3302 via mounting assembly 3402, a rigid structure is provided in place of the blade 404 to maintain the vertical structural integrity of the rotor FIG. 6. This enables easier repair and replacement of blades 404 within a rotor by retaining the rotors structural integrity while a blade is missing. The Jack Leg 3412 is also used during initial construction to separate two Torque Rings 3302 while the blades 404 are installed.

Referring now to FIGS. 9 and 10 there is illustrated the manner for utilizing a Jack Leg 3412 when removing a blade 404 from a rotor. FIG. 9 illustrates a blade 404 that is interconnected between a upper Torque Ring mounting connector 3402 and a lower Torque Ring mounting connector 3402 connecting to the top and bottom corners of the blade respectively. If the blade 404 needs to be removed for any reason such as a repair, a Jack Leg 3412 may be supported there between as illustrated in FIG. 10.

As shown in FIG. 10, the Jack Leg 3412 includes a vertical member 3702 having a top connection plate 3704 for interconnecting with the bottom connection plate 3410 of the Torque Ring mounting connector 3402 located above the Jack Leg 3412. Similarly, a lower connection plate 3706 connects to a top plate connector 3408 of the lower Torque Ring mounting bracket connector 3402 located below the Jack Leg 3512. The Jack Leg 3412 will provide a rigid vertical structural connection between the upper and lower Torque Rings in the absence of the blade 404.

Jack Legs 3412 serve another critical function during initial Wind Turbine installations. During initial Wind Turbine installation Jack Legs 3412 are first installed to support and separate the second vertical layer of Torque Rings 3302 until the first layer of blades 404 are installed within a rotor FIG. 6. This process is repeated for a next layer of Torque Rings 3302 with Jack Legs 3412 and installing the second group of blades 404 within a second rotor located above the first rotor. This process is repeated until the operational vertical height of the Wind Turbine is reached when installing all rotors 106 of the Wind Turbine 102.

It should be further noted that the transmission 3420 (FIG. 6) of the Wind Turbine (which is located at ground level) can lock or index the rotation of the Wind Turbine. This is especially needed during installation and maintenance. Indexing allows a centralized work station to be established wherein; via indexing, a blade's position (CW or CCW) the blade can be positioned at the centralized work station.

What is claimed is:

1. A vertical axis Wind Turbine, comprising:
    a support structure for supporting the vertical axis Wind Turbine above ground level;
    at least one rotor for rotating upon the support structure, the at least one rotor comprising a horizontal structure having a rotational axis perpendicular to the ground level;
    wherein the support structure further comprises at least one circular Torque Ring member extending around the rotational axis of the at least one rotor;
    a plurality of blades positioned within each of the at least one rotor for causing the at least one rotor to rotate on the support structure responsive to a wind force;
    a plurality of Torque Ring mounting connectors associated with each of the plurality of blades for interconnecting the at least one circular Torque Ring member to the plurality of blades; and
    a plurality of vanes located on each of the plurality of blades, the plurality of vanes rotating between an open position to limit drag on the at least one rotor and a closed position that provides a rotational force to the at least one rotor, the plurality of vanes rotating between the open position and the closed position responsive to the wind force.

2. The vertical axis Wind Turbine of claim 1 further comprising:
    a plurality of vane stops each associated with a vane of the plurality of vanes for stopping rotation of the vane when the vane reaches the closed position; and
    a vane control mechanism associated with each vane/vane stop to lessen a force with which the vane impacts a vane stop when moving to the closed position.

3. The vertical axis Wind Turbine of claim 1 further comprising at least one Jack Leg connector for interconnection between a first Torque Ring mounting connector and a second Torque Ring mounting connector, wherein the first Torque Ring mounting connector is located above the second Torque Ring mounting connector.

4. The vertical axis Wind Turbine of claim 3, wherein the at least one Jack Leg connector further comprises:
    a member extending between the first Torque Ring mounting connector and the second Torque Ring mounting connector as required;
    a first connector plate for connecting a first end of the member to the first Torque Ring mounting connector; and
    a second connector plate for connecting a second end of the member to the second Torque Ring mounting connector.

5. The vertical axis Wind Turbine of claim 1, wherein the plurality of Torque Ring mounting connectors further comprises:
    a member perpendicularly connected to the at least one circular Torque Ring member and having a first end and a second end;
    a first connection plate connected to the first end of the member for connecting with a blade of the plurality of blades; and
    a second connection plate connected to the second end of the member for connection with at least one of a second blade of the plurality of blades or a roller mechanism.

6. The vertical axis Wind Turbine of claim 1 further comprising a plurality of roller assemblies enabling the at least one rotor to rotate upon the support structure.

7. The vertical axis Wind Turbine of claim 6, wherein the at least one circular Torque Ring member transmits torque from remaining circular Torque Ring members when a blade is removed and absorbs rotation torque forces from the plurality of blades and the plurality of roller assemblies.

8. A vertical axis Wind Turbine, comprising:
    a support structure for supporting the vertical axis Wind Turbine above ground level;
    at least one rotor for rotating upon the support structure, the at least one rotor comprising a horizontal structure having a rotational axis perpendicular to the ground level;
    wherein the support structure further comprises at least one circular Torque Ring member extending around the rotational axis of the at least one rotor;
    a plurality of blades positioned within each of the at least one rotor for causing the at least one rotor to rotate on the support structure responsive to a wind force, wherein at least one blade is missing within the at least one rotor;
    a plurality of Torque Ring mounting connectors for interconnecting each of the plurality of blades with the at least one circular Torque Ring member;
    at least one Jack Leg connector located within a position of the at least one blade missing within the at least one rotor between a first Torque Ring mounting connector and a second Torque Ring mounting connector, wherein the first Torque Ring mounting connector is located above the second Torque Ring mounting connector; and
    a plurality of vanes located on each of the plurality of blades, the plurality of vanes rotating between an open position to limit drag on the at least one rotor and a closed position that provides a rotational force to the at least one rotor, the plurality of vanes rotating between the open position and the closed position responsive to the wind force.

9. The vertical axis Wind Turbine of claim 8 further comprising:
a plurality of vane stops each associated with a vane of the plurality of vanes for stopping rotation of the vane when the vane reaches the closed position; and
a vane control mechanism associated with each vane/vane stop to lessen a force with which the vane impacts a vane stop when moving to the closed position.

10. The vertical axis Wind Turbine of claim 8, wherein the at least one Jack Leg connector further comprises:
a member extending between the first Torque Ring mounting connector and the second Torque Ring mounting connector;
a first connector plate for connecting a first end of the member to the first Torque Ring mounting connector; and
a second connector plate for connecting a second end of the member to the second Torque Ring mounting connector.

11. The vertical axis Wind Turbine of claim 8, wherein the plurality of Torque Ring mounting connectors further comprises:
a member perpendicularly connected to the at least one circular Torque Ring member and having a first end and a second end;
a first connection plate connected to the first end of the member for connecting with a blade of the plurality of blades; and
a second connection plate connected to the second end of the member for connection with at least one of a second blade of the plurality of blades or a roller mechanism.

12. The vertical axis Wind Turbine of claim 8 further comprising a plurality of roller assemblies enabling the at least one rotor to rotate upon the support structure.

13. The vertical axis Wind Turbine of claim 12, wherein the at least one circular Torque Ring Member transmits torque from remaining circular Torque Ring members when a blade is removed and absorbs rotation torque forces from the plurality of blades and the plurality of roller assemblies.

14. A vertical axis Wind Turbine, comprising:
a support structure for supporting the vertical axis Wind Turbine above ground level, wherein the support structure further comprises a plurality of circular Torque Ring members extending around a rotational axis of the vertical axis Wind Turbine;
at least one rotor for rotating upon the support structure, the at least one rotor comprising a horizontal structure rotating about the rotational axis of the vertical axis Wind Turbine perpendicular to the ground level;
a plurality of blades positioned within each of the at least one rotor for causing the at least one rotor to rotate about the rotational axis of the vertical axis Wind Turbine on the support structure responsive to a wind force;
a plurality of Torque Ring mounting connectors associated with each of the plurality of blades for interconnecting the plurality of circular Torque Ring members to the plurality of blades, wherein the plurality of Torque Ring mounting connectors further comprises:
a member perpendicularly connected to the plurality of circular Torque Ring members and having a first end and a second end;
a first connection plate connected to the first end of the member for connecting with a blade of the plurality of blades; and
a second connection plate connected to the second end of the member for connection with at least one of a second blade of the plurality of blades or a roller mechanism; and
a plurality of vanes located on each of the plurality of blades, the plurality of vanes rotating between an open position to limit drag on the at least one rotor and a closed position that provides a rotational force to the at least one rotor, the plurality of vanes rotating between the open position and the closed position responsive to the wind force.

15. The vertical axis Wind Turbine of claim 14 further comprising:
a plurality of vane stops each associated with a vane of the plurality of vanes for stopping rotation of the vane when the vane reaches the closed position; and
a vane control mechanism associated with each vane/vane stop to lessen a force with which the vane impacts a vane stop when moving to the closed position.

16. The vertical axis Wind Turbine of claim 14 further comprising at least one Jack Leg connector for interconnection between a first Torque Ring mounting connector and a second Torque Ring mounting connector, wherein the first Torque Ring mounting connector is located above the second Torque Ring mounting connector.

17. The vertical axis Wind Turbine of claim 16, wherein the at least one Jack Leg connector further comprises:
a member extending between the first Torque Ring mounting connector and the second Torque Ring mounting connector;
a first connector plate for connecting a first end of the member to the first Torque Ring mounting connector; and
a second connector plate for connecting a second end of the member to the second Torque Ring mounting connector.

18. The vertical axis Wind Turbine of claim 14 further comprising a plurality of roller assemblies enabling the at least one rotor to rotate upon the support structure.

19. The vertical axis Wind Turbine of claim 18, wherein the plurality of circular Torque Ring members transmit torque from remaining circular Torque Ring members when a blade is removed and absorbs rotation torque forces from the plurality of blades and the plurality of roller assemblies.

* * * * *